(12) United States Patent
Rekimoto

(10) Patent No.: US 8,683,336 B2
(45) Date of Patent: Mar. 25, 2014

(54) INTER-DEVICE OPERATION INTERFACE, DEVICE CONTROL TERMINAL, AND PROGRAM

(75) Inventor: Junichi Rekimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 956 days.

(21) Appl. No.: 12/124,381

(22) Filed: May 21, 2008

(65) Prior Publication Data

US 2009/0049386 A1 Feb. 19, 2009

(30) Foreign Application Priority Data

Jun. 6, 2007 (JP) ................................ P2007-150930

(51) Int. Cl.
*G06F 3/00* (2006.01)

(52) U.S. Cl.
USPC .......................................... 715/717; 715/719

(58) Field of Classification Search
USPC ................................................. 715/719, 717
See application file for complete search history.

(56) References Cited

U.S. PATENT DOCUMENTS

| 2004/0259499 A1* | 12/2004 | Oba et al. ..................... 455/41.2 |
| 2006/0150115 A1* | 7/2006 | Jin et al. .......................... 715/764 |
| 2007/0080940 A1* | 4/2007 | Aoki et al. ..................... 345/158 |

FOREIGN PATENT DOCUMENTS

| JP | 7-146774 | 6/1995 |
| JP | 2001-92575 | 4/2001 |
| JP | 2007-4773 | 1/2007 |

* cited by examiner

*Primary Examiner* — Andrea Leggett
(74) *Attorney, Agent, or Firm* — Sherr & Jiang, PLLC

(57) ABSTRACT

There is provided an inter-device operation interface that is displayed on a display unit of a device control terminal that controls an operation between devices connected through a network, including: a contents display area to display information of contents held by a device; an operation display area to display information of an operation executed to the contents; and a device display area to display information serving as a target of the operation, and wherein, when information displayed in each of the display areas is selected by using the operation unit of the device control terminal, a service provided by the device connected through a wide-area network is displayed in the device display area as the candidate of the target.

18 Claims, 9 Drawing Sheets

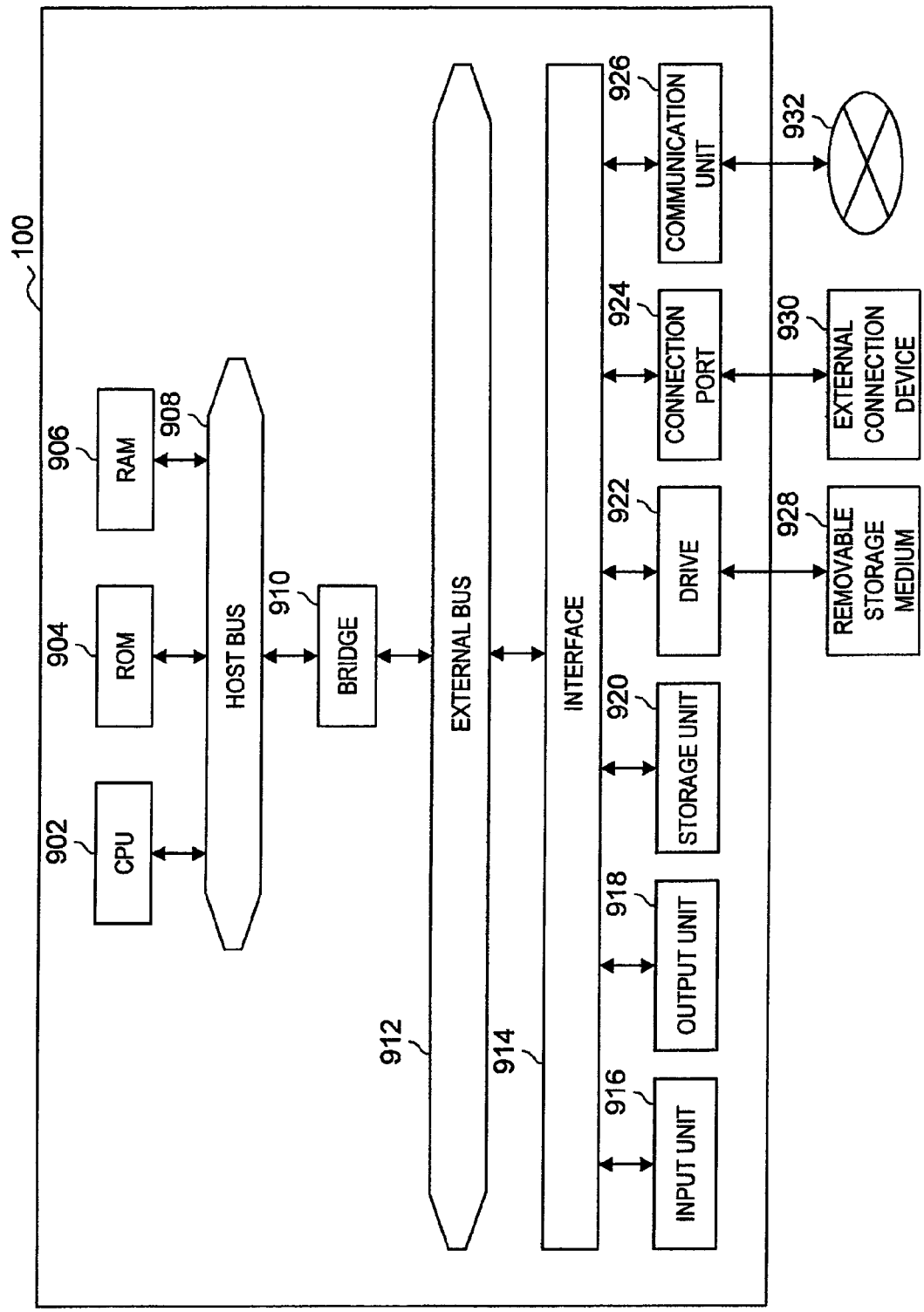

INTER-DEVICE OPERATION INTERFACE, DEVICE CONTROL TERMINAL, AND PROGRAM

CROSS REFERENCES TO RELATED APPLICATIONS

The present invention contains subjected matter related to Japanese Patent Application JP 2007-150930 filed in the Japan Patent Office on Jun. 6, 2007, the entire contents of which being incorporated herein by reference.

BACKGROUND OF THE INVENTION

1. Field of the Invention

The present invention relates to an inter-device operation interface, a device control terminal, and a program.

2. Description of the Related Art

In recent years, a large part of information related to video data, music data, and the like have been managed as digital data. With the development of information communication technology, a service in that digitalized video or music data or the like is recorded on a server to distribute the recorded various data to a user through a network has been spreading out. Furthermore, a service in that data such as a picture or a video clip is uploaded on a server on a network, and is shared among users has been also spreading out.

Recently, a utility form in that video data or music data recorded on a computer in a study has been viewed on a television installed in a living room by using a network (so-called home network) laid down has been realized. As another example, a utility form in that a user operates a remote controller while watching a TV screen to record a broadcast program on a recording device on a home network installed on a distant place has been also realized.

However, at the present, since a screen interface of a television or the like is designed centering around an operation related to the television, a process of cooperating with a plurality of devices on a home network is difficult to be executed. Even though an icon or the like representing an inter-device operation is added to such a screen interface, the screen interface has such a cumbersome configuration that a user can hardly use the screen interface. Furthermore, recently, the number of types of devices or the number of devices connected to the home network increases, a technique to easily realize matching between contents held by the devices and the devices in which the contents are executed is desired to be developed.

In relation to an interface which operates a plurality of connection devices, for example, Japanese Patent Application Laid-Open No. H07-146774, a technique that operates icons displayed on a screen to control reproducing and recording of a video image, music, or the like between devices connected to the icons is disclosed. Furthermore, in this document, a technique that expresses states of the devices by changes in shape of the icons is also disclosed. As in Japanese Patent Application Laid-Open No. H07-146774, Japanese Patent Application Laid-Open No. 2001-92575 discloses an interface technique in that connected devices are expressed by icons on a screen, and, when one of the icons is selected, an operation matched with the device of the selected icon and a candidate of a device to be operated by the operation are narrowed down and displayed.

SUMMARY OF THE INVENTION

However, although the techniques described in the documents are suitable to match the connected devices, a video image or music recorded on the devices or functions held by the devices is necessarily comprehended. For this reason, it is very difficult that a user selects a device matched with an inter-device operation or an operation from devices connected through a home network or a wide-area network such as the Internet by using these techniques.

Therefore, the present invention has been made in consideration of the issue, and it is desirable to provide a novel and improved inter-device operation interface, a device control terminal, and a program which can more easily realize an operation of contents between devices on a network.

In order to solve the above issue, according to an embodiment of the present invention, there is provided an inter-device operation interface displayed on a display unit of a device control terminal that controls an operation between devices connected through a network.

The inter-device operation interface has a contents display area to display information of contents held by a device, an operation display area to display information of an operation executed to the contents, and a device display area to display information serving as a target of the operation. When information displayed in each of a display area is selected by using an operation unit of a device control terminal, a service provided by a device connected through a wide-area network can be displayed in a device display area as a candidate of a target.

In the device display area, information of a network storage service that records information on a device connected through a wide-area network to make it possible to be browsed from another device connected to the wide-area network may be displayed as a service.

In the device display area, as information of a network storage service, address information expressing a location of a device that provides the network storage service may be displayed.

In the device display area, as a candidate of a target, one device or a plurality of devices that can reproduce or record contents may be displayed.

In the device display area, as a candidate of a target, a playlist to which information of contents can be added may be displayed.

In the device display area, information of a device selected on the basis of a positional relationship or a distance between the device and the device control terminal.

In the contents display area, as information of contents, information of a device that provides the contents may be displayed.

In the contents display area, as information of a device, folder information representing a position in the device in which contents are stored may be displayed.

In the contents display area, as information of a device, physical position information representing a position where the device is installed may be displayed.

In the contents display area, a playlist expressing combinations of a plurality of contents may be displayed.

When information to be displayed in each area is to be selected by using the operation unit of the device control terminal, depending on types of information selected from pieces of information displayed on the contents display area, the operation display area, and the device display area, information displayed in another display area may be restricted by the type of the selected information, or information matched with the type of the selected information may be emphatically displayed.

In the operation display area, reproducing, recording, moving, copying, or uploading of contents may be displayed as an operation depending on the information displayed in the contents display area or the type of the information selected from the pieces of information displayed in the device display area.

In order to solve the issue, according to another embodiment of the present invention, there is provided a device control terminal including a display unit on that the inter-device operation interface is displayed, a display control unit that controls display of each display area held by the inter-device operation interface, and an operation unit that selects information displayed in each display area to execute the selected operation.

In order to solve the issue, according to still another embodiment of the present invention, there is provided a program that causes a computer to realize a function of performing display control of the inter-device operation interface. Furthermore, there is provided a recording medium on which the program is recorded.

Use of the graphical user interface, the apparatus, and the program makes it possible for a user to operate contents between the devices without regard to the device configuration on the network. Furthermore, since a user can use various services without regard to a device connected through a wide-area network and a device connected through a home network, convenience for a user is considerably improved.

According to the embodiments of the present invention described above, an operation across devices on a network can be more easily executed.

BRIEF DESCRIPTION OF THE DRAWINGS

FIG. 9 is a diagram for explaining a hardware configuration of the device control terminal according to the embodiment.

DETAILED DESCRIPTION OF THE PREFERRED EMBODIMENTS

Figure 1:
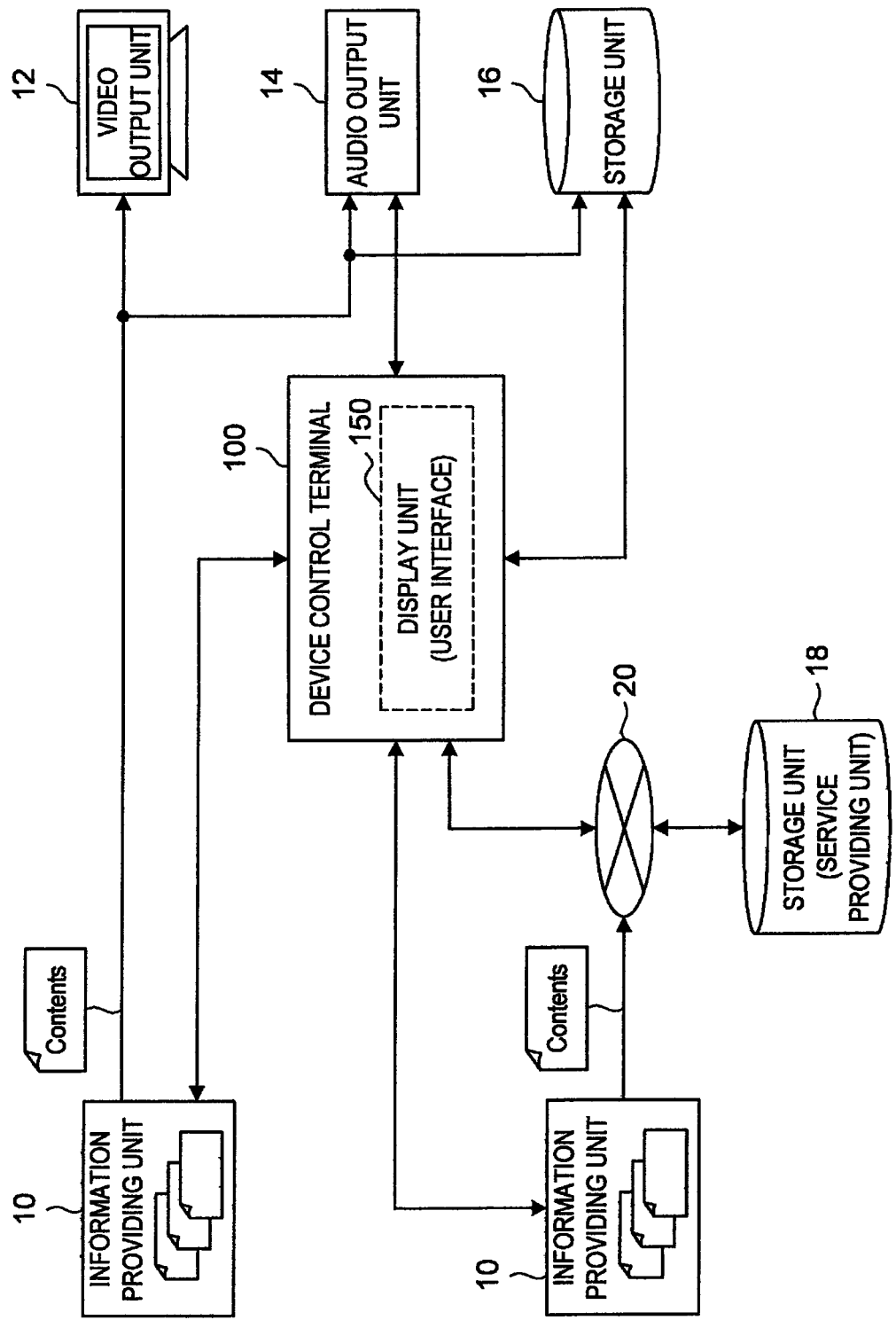
FIG. 1 is a diagram for explaining an example of a network configuration according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Embodiment of the Present Invention

Before a detailed explanation of a function configuration of a device control terminal 100 according to an embodiment of the present invention, an example of a network configuration to which the device control terminal 100 can be applied will be briefly described with reference to FIG. 1. FIG. 1 is a diagram for explaining an example of a network configuration to which the embodiment can be applied.

(Network Configuration)

As show in FIG. 1, the network mainly includes a plurality of information providing units 10, a video output unit 12, an audio output unit 14, and a storage unit 16. Furthermore, one of the information providing units 10 is connected to a storage unit 18 through a wide-area network 20. A network which is simply mentioned hereinafter mainly means a home network, and a wide-area network which is mentioned hereinafter mainly means an external network such as the Internet.

The information providing units 10 holds contents such as video data or music data, and has a function of providing the information of the contents to another device through a network or the like. For example, the information providing units 10 includes a hard disk recorder, a digital camera, a digital video camera, an audio device, a mobile audio player, and the like connected to a network.

As shown in FIG. 1, the information providing units 10 can provide video contents to the video output unit 12 on the network or provides music contents to the audio output unit 14. The information providing units 10 can also provide arbitrary contents to the storage unit 16 connected to the network. The video output unit 12 includes, for example, a television, a display device, and the like. The audio output unit 14 includes, for example, an audio output device of a television, a loudspeaker of an audio device, and the like. The storage unit 16 includes, for example, a hard disk recorder, a removal storage medium connected to a computer, and the like.

Furthermore, the information providing units 10 can provide video contents, music contents, or the like to the storage unit 18 through the wide-area network 20. In this case, the storage unit 18 has, for example, a function of a network storage server and a function of a contents server that publishes contents stored by the information providing units 10 or the like to another user. Furthermore, the storage unit 18 may have a service providing unit that uses the contents provided from the information providing units 10 or the like to provide various network services. For example, the service providing unit can provide a service that publishes uploaded image data or the like to a general user or a user who restricted in browsing.

The device control terminal 100 is an apparatus that performs control such that the contents held by the information providing units 10 are processed by the video output unit 12, the audio output unit 14, the storage unit 16 or the storage unit 18, and the like. For this reason, the device control terminal 100 acquires information of the contents held by the information providing units 10 and information of the video output unit 12, the audio output unit 14, the storage unit 16 or 18, or the like to show these pieces of information to a user through a display unit 150. At this time, even though information of contents which can be processed by each of the devices and information of an operation which can be executed for each contents are not recognized, the device control terminal 100 can show the information to the user by using a user interface which can select a preferable combination between the contents, the devices, and the operations.

As is briefly described above, the device control terminal 100 according to the embodiment is applied to an operation of contents between devices on a network including the wide-area network 20. As described above, devices having various functions are present on the network, and, at the same time, contents of various types are stored in one device or a plurality of devices. For this reason, the network has a very complex configuration. Devices on the network can be freely added or deleted, and functions held by the devices can be changed.

This is because the functions of the devices are realized by modules and realized by software. Services provided by the storage unit 18 belong to the same category.

As will be described below in detail, the device control terminal 100 according to the embodiment and the user interface included in the device control terminal 100 makes it possible for a user to perform a contents operation between devices without regard to the complex device configuration and a change of configurations.

[Function Configuration of Device Control Terminal 100]

Figure 2:
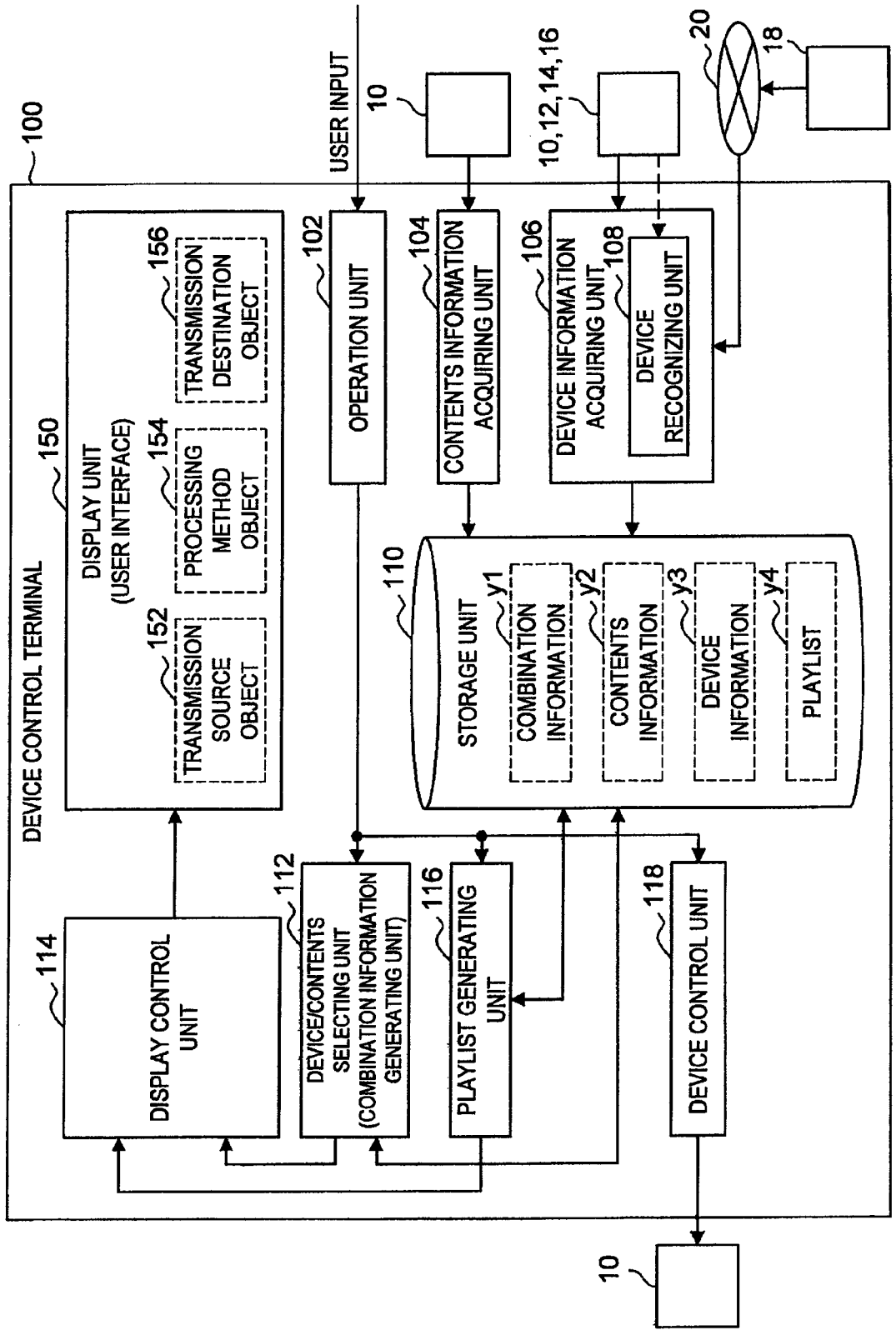
FIG. 2 is a diagram for explaining a function configuration of a device control terminal according to the embodiment.
Figure 3:
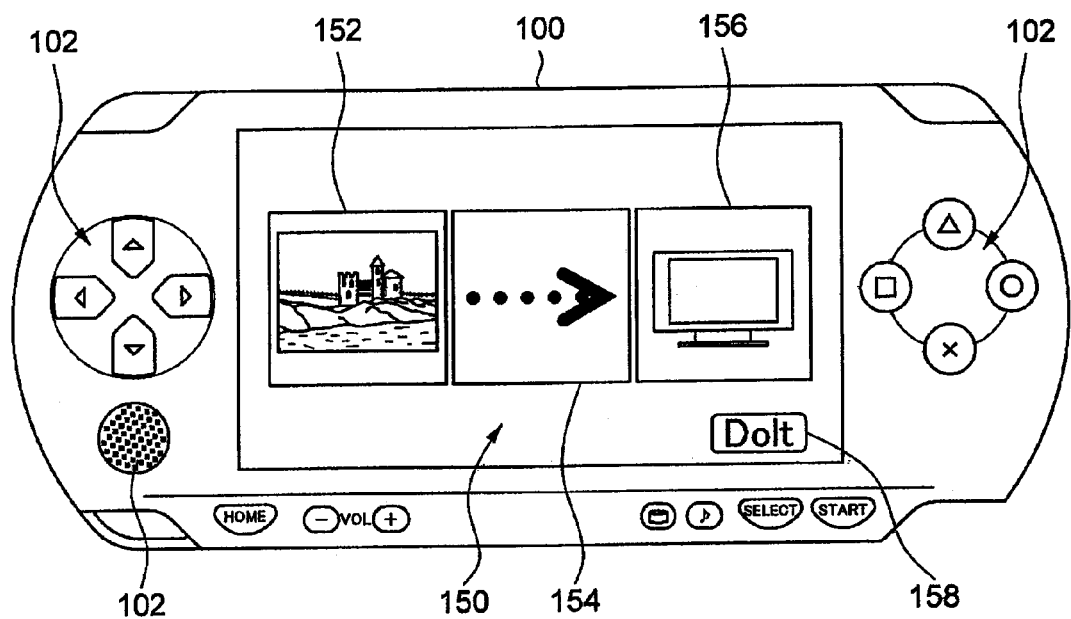
FIG. 3 is a diagram for explaining a configuration of a user interface according to the embodiment.

A function configuration of the device control terminal 100 according to the embodiment will be described below in detail with reference to FIG. 2, and a user interface displayed on the display unit 150 will be also described with reference to FIGS. 3 to 8. FIG. 2 is a diagram for explaining a function configuration of the device control terminal 100 according to the embodiment. FIG. 3 is a diagram for explaining an example of a device configuration of the device control terminal 100 according to the embodiment. FIGS. 4 to 8 are diagrams for explaining configurations of an inter-device operation interface according to the embodiment.

As shown in FIG. 2, the device control terminal 100 mainly includes an operation unit 102, a contents information acquiring unit 104, a device information acquiring unit 106, a storage unit 110, a device/contents selecting unit (combination information generating unit) 112, a display control unit 114, a playlist generating unit 116, a device control unit 118, and the display unit 150. The device information acquiring unit 106 includes a device recognizing unit 108. Furthermore, on the display unit 150, a transmission source object, a processing method object, and a transmission destination object are displayed.

(Operation Unit 102)

The operation unit 102 is an input device to select desired information from options displayed on the display unit 150. The operation unit 102 is also used to fix a process executed on the basis of a combination of pieces of information displayed on the display unit 150. The operation unit 102 transmits information input by a user to the device/contents selecting unit 112, the playlist generating unit 116, or the device control unit 118. As shown in FIG. 3, the operation unit 102, for example, an arrow key which can select an upward, downward, left, and right direction, an execution button to fix a process, function buttons assigned to a plurality of functions, and the like. The execution button may be realized by an object displayed on a screen as indicated by a reference numeral 158.

(Contents Information Acquiring Unit 104)

FIG. 2 is referred to again. The contents information acquiring unit 104 acquires information related to contents from the information providing unit 10 such as a contents server or the like. For example, the contents information acquiring unit 104 acquires a type of contents held by the information providing unit 10 or information of a file format or the like. At this time, the contents information acquiring unit 104 can also acquire metadata added to the contents, a thumbnail image, or the like. For example, the metadata may include the title, players, copyright information, or the like of the contents. The thumbnail can be used as, for example, an object displayed on the display unit 150. The contents information acquiring unit 104 records the information of the contents acquired from the information providing unit 10 on the storage unit 110.

(Device Information Acquiring Unit 106)

The device information acquiring unit 106 acquires information related to devices such as the information providing unit 10, the video output unit 12, the audio output unit 14, or the storage unit 16 connected to the network. The device information acquiring unit 106 acquires, as the information related the devices, information of a type of a process which can be executed by the device or a contents format which can be processed by the device. The device information acquiring unit 106 can also acquire information of a device state including, for example, a load state of a device or a traffic state of a path connected to the device. Furthermore, the device information acquiring unit 106 can also acquire information of a physical position where the device is installed and a distance and a positional relationship between the device and the device control terminal 100.

The device information acquiring unit 106 can acquire, from an external device such as the storage unit 18 connected to the wide-area network 20, information of a service provided by the external device. At this time, the device information acquiring unit 106 can acquire a thumbnail corresponding to a service provided by the external device. The acquired thumbnail can be used as an object displayed on the display unit 150. Furthermore, the device information acquiring unit 106 can acquire, as information of a service, the type of the service, a format of corresponding contents, or a user who can use the service.

The device information acquiring unit 106 may further include the device recognizing unit 108. The device recognizing unit 108 is a communication unit which can wirelessly communicate with a device such as the information providing unit 10, the video output unit 12, the audio output unit 14, or the storage unit 16 connected to the network. The device recognizing unit 108 is, for example, a communication unit such as a non-contact IC (Integrated Circuit) chip, an RFID (Radio Frequency IDentification) tag, an infrared communication device, or a visible-light communication device. The device recognizing unit 108 performs recognition of a field intensity or an in-house position by the communication unit to make it possible to recognize a physical position, positional relationship, or the like between the device and the device control terminal 100. The device information acquiring unit 106 stores the information of the device acquired by the device recognizing unit 108 in the storage unit 110.

(Storage Unit 110)

In the storage unit 110, the pieces of information (contents information y2 and device information y3) acquired by the contents information acquiring unit 104 and the device information acquiring unit 106 are stored, and combination information y1 representing a combination between contents and a device selected by a user, contents playlist y4 representing a combination between a plurality of contents, and the like are stored. Furthermore, in the storage unit 110, a history of combination information selected by the user can be recorded. The pieces of information are read by the device/contents selecting unit 112 or the playlist generating unit 116 and used.

(Device/Contents Selecting Unit 112)

The device/contents selecting unit 112 can transmit the contents information y2 and the device information y3 stored in the storage unit 110 to the display control unit 114. When the device/contents selecting unit 112 receives input information of a user from the operation unit 102, the device/contents selecting unit 112 selects, depending on the input information, a matched device, a matched operation, or a candidate of contents.

For example, when information of certain contents is input, the device/contents selecting unit 112 selects a device matched with the contents with reference to the contents information y2 and the device information y3 stored in the storage unit 110 to generate the combination information y1.

The device/contents selecting unit 112 transmits the combination information y1 to the display control unit 114 and stores the combination information y1 in the storage unit 110. When the combination information y1 related to the contents is included in the storage unit 110, the device/contents selecting unit 112 transmits the combination information y1 related to the contents to the display control unit 114. The device/contents selecting unit 112 may update the combination information y1 at predetermined time intervals on the basis of the contents information y2 and the device information y3 stored in the storage unit 110.
(Display Control Unit 114)

The display control unit 114 performs display control of an object displayed on the display unit 150. For example, the display control unit 114 displays information of selectable contents, device, or operation by a scrollable icon or the like on the display unit 150 on the basis of the contents information y2 or the device information y3 stored in the storage unit 110.

The display control unit 114 performs display control of an object displayed on the display unit 150 on the basis of the combination information y1 input from the device/contents selecting unit 112. For example, when a user selects contents, the display control unit 114 receives the combination information y1 generated by the device/contents selecting unit 112 and displays only the information of the selectable device and the selectable operation by a scrollable icon or the like. The display control unit 114 can also display only the information of the selectable device and the selectable operation to be highlighted. Furthermore, the display control unit 114 can display a playlist expressing combinations of contents in place of the contents or the devices.
(Playlist Generating Unit 116)

The playlist generating unit 116 generates a playlist expressing combinations of contents to be reproduced. The playlist generating unit 116 generates an empty playlist and transmits the playlist to the display control unit 114. When the playlist generating unit 116 is instructed to add contents to the playlist, the playlist generating unit 116 adds the contents to the empty playlist. When the playlist generating unit 116 is further instructed to add contents, the playlist generating unit 116 adds the contents to the playlist. The playlist generating unit 116 stores the generated playlist in the storage unit 110. In contrast to this, when the playlist generating unit 116 is instructed to delete contents, the playlist generating unit 116 reads the playlist y4 stored in the storage unit 110 to make it possible to delete the contents from the playlist.
(Device Control Unit 118)

When a combination between, contents, an operation, and a device is fixed to transmit an execution instruction to the device control unit 118 through the operation unit 102, the device control unit 118 controls the information providing unit 10 on the basis of the combination. For example, when "contents held by the information providing unit 10", the "video output unit 12", and "reproduction" are selected to transmit an execution instruction based on the combination to the device control unit 118, the device control unit 118 controls the information providing unit 10 to output the designated contents to the video output unit 12 to cause the video output unit 12 to reproduce the contents. For example, the device control unit 118 issues a control command to the information providing unit 10.
(Display Unit 150)

On the display unit 150, information of a thumbnail image or the like included in the combination information y1, information of a thumbnail image or the like included in the device information y3, information of a thumbnail image or the like representing the playlist y4, or information of a thumbnail image or the like representing an operation method is displayed. The information of a thumbnail image or the like includes not only the thumbnail image, but also meta-information, explanation information, or the like related to, for example, contents of the thumbnail images, a device, a playlist or an operation method. The information of the thumbnail image or the like is called an object.

The display unit 150 includes a contents display area 152 in which a transmission source object is displayed, an operation display area 154 in which a processing method object is displayed, and a device display area 156 in which a transmission destination object is displayed. In the contents display area 152, a processing subject such as contents or a playlist is displayed as a transmission source object. In the operation display area 154, a processing method object representing a processing method such as reproducing (display or streaming), copying, moving, uploading, registration, synchronization, or calling is displayed. Furthermore, in the device display area 156, a transmission destination object such as a device or a playlist is displayed. These objects are displayed by icons expressed by thumbnail images, and a plurality of options are scroll-displayed by an operation of the operation unit 102.

The function configuration of the device control terminal 100 according to the embodiment is described above. A concrete operation realized by the function configuration, a screen configuration of a user interface, and the like will be described below in detail.
[Display Configuration of Inter-device Operation Interface]

A display configuration of an inter-device operation interface according to the embodiment will be described below with reference to FIGS. 3 to 8. The inter-device operation interface corresponds to the display unit 150 described above.
(Screen Configuration)

FIG. 3 is referred to. FIG. 3 is a diagram for explaining a concrete example of the device control terminal 100 according to the embodiment.

As shown in FIG. 3, the display unit 150 of the device control terminal 100 includes the contents display area 152 in which a transmission source object is displayed, the operation display area 154 in which a processing method object is displayed, and the device display area 156 in which a transmission destination object is displayed. Each of the objects is expressed by an icon using a thumbnail image. Furthermore, an execution button 158 is displayed on the display unit 150. When the execution button 158 is depressed, the device control unit 118 executes a process on the basis of a combination between objects displayed on the display unit 150.

The transmission source object represents, for example, the contents held by any one of the information providing units 10 on the network. The transmission source object may express a device such as the information providing unit 10 itself which holds contents. The transmission source object may express a folder or the like in which an object is stored in the device such as the information providing unit 10.

The transmission destination object represents, for example, a device on the network that can receive and reproduce or record contents. The transmission source object may be an object that indicates a network service provided by a server connected through the wide-area network 20. The network server includes, for example, an SNS (Social Networking Service) or the like. As a concrete example, a network sharing service or a network storage service for video data, text information, or the like is given.

The processing method object represents a processing method which matched with the object displayed in the contents display area 152 and the object displayed in the device display area 156. For example, the processing method object represents a processing method such as reproducing (display or streaming), copying, moving, uploading, registration, synchronization, or calling.

Each of the objects, for example, is vertically scrolled to make it possible to display a selectable candidate. At this time, a user vertically scroll-displays the object by using the operation unit 102 (arrow key) to make it possible to select a desired object. For example, when the transmission source object is selected, the display control unit 114 displays and controls a candidate of the processing method object and a candidate of the transmission destination object on the basis of the combination information y1. Moreover, the display control unit 114 controls only an object matched with the selected transmission source object to scroll-display the object.

The user may set an order of objects to be selected as an order given by "transmission destination object → processing method object → transmission source object". In contrast to this, the user may sequentially select the objects from the transmission source object. The user may select the transmission source object and the transmission destination object first, and may subsequently select the narrowed-down processing method object. In the example in FIG. 3, video contents corresponding to the transmission source object and a television corresponding to the transmission destination object are designated. At this time, as the processing method object, for example, only "reproduction" can be selected. Therefore, when the user depresses the execution button 158, the selected video contents are broadcasted on the television.

Example 1 of Operation Method

Basic Configuration

FIGS. 4A to 4D are referred to. FIGS. 4A to 4D are diagrams for explaining a variation of the operation method according to the embodiment.

Figure 4A:
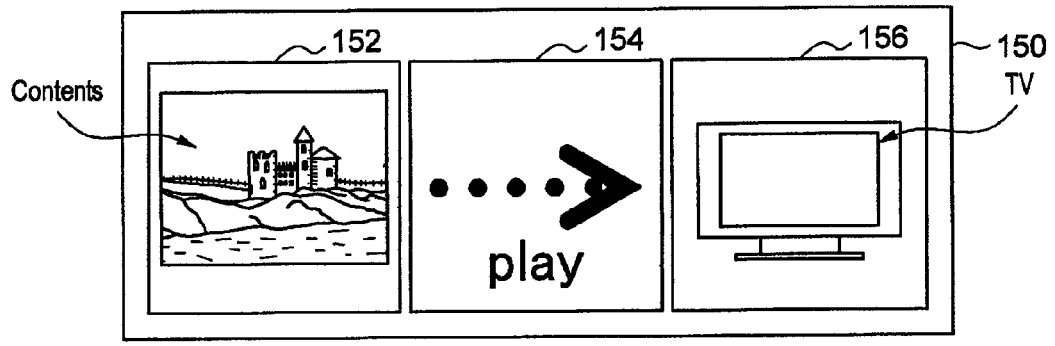
FIGS. 4A to 4D are diagrams for explaining an inter-device controlling method according to the embodiment.

FIG. 4A shows a case in that video contents are reproduced by a television in a living room. In the contents display area 152, the video contents are displayed. In the device display area 156, the television placed in the living room is displayed. In the operation display area 154, an object "play" representing "reproduction" is displayed. In this state, when the execution button 158 is depressed, the video contents are reproduced by the television in the living room.

Figure 4B:
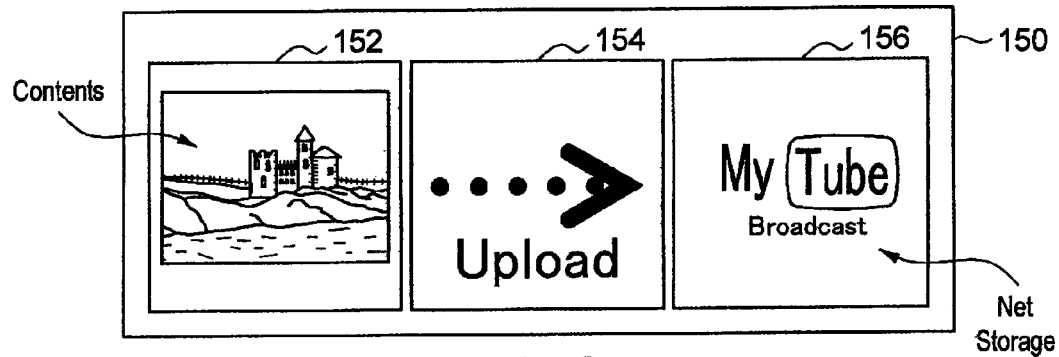

FIG. 4B shows a case in that video contents are uploaded on a network storage server. In the contents display area 152, the video contents are displayed. In the device display area 156, a storage service provided by the network storage server is displayed. In the operation display area 154, "Upload" representing "uploading" is displayed. In this state, when the execution button 158 is depressed, the video contents are uploaded on the network storage server.

Figure 4C:
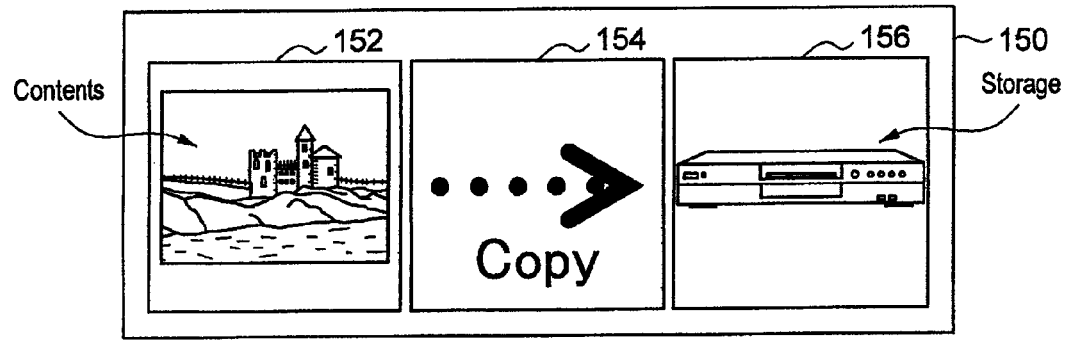

FIG. 4C shows a case in that video contents are recorded on a hard disk recorder. In the contents display area 152, the video contents are displayed. In the device display area 156, a hard disk recorder is displayed. In the operation display area 154, an object "Copy" representing "recording" is displayed. In this state, when the execution button 158 is depressed, the video contents are recorded on the hard disk recorder. However, even though the recording process is executed, the video contents are not deleted from the transmission source in the "Copy" operation.

Figure 4D:
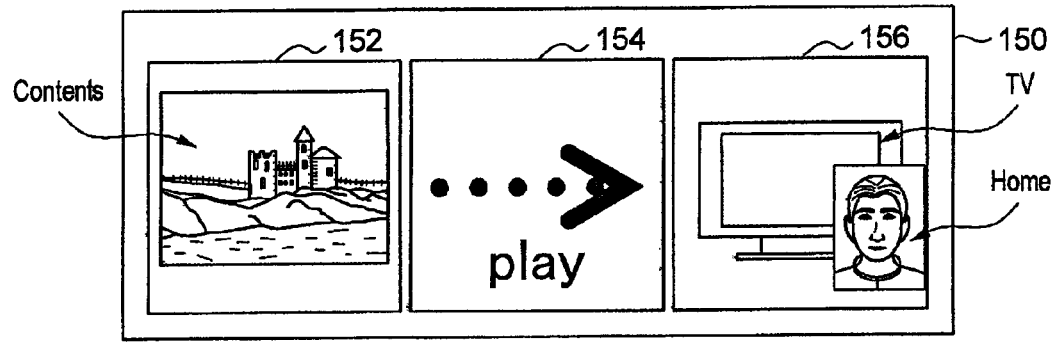

FIG. 4D shows a case in that video contents are reproduced by a television at a family home. In the contents display area 152, the video contents are displayed. In the device display area 156, the television placed at the family home is displayed. In the operation display area 154, "play" representing "reproduction" is displayed. In this state, when the execution button 158 is depressed, the video contents are streaming-reproduced on the television at the family home. As in the example, in the device display area 156, an object ("Home" in FIG. 4D) representing a physical position such as a "family home" may be displayed. In this manner, the display control unit 114 can display information selected from the device information y3 stored in the storage unit 110 and representing a physical installation position of a device acquired through the device/contents selecting unit 112 on the device display area 156.

Example 2 of Operation Method

Creation of Playlist

Figure 5A:
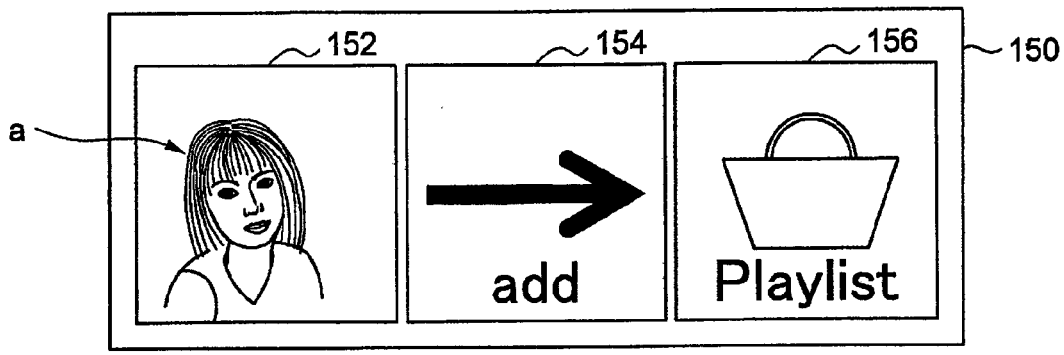
FIGS. 5A to 5C are diagrams for explaining a playlist generating method according to the embodiment.
Figure 5B:
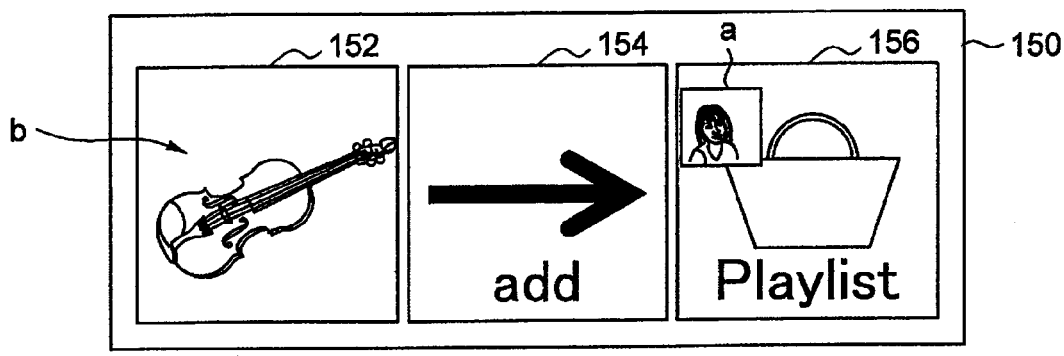
Figure 5C:
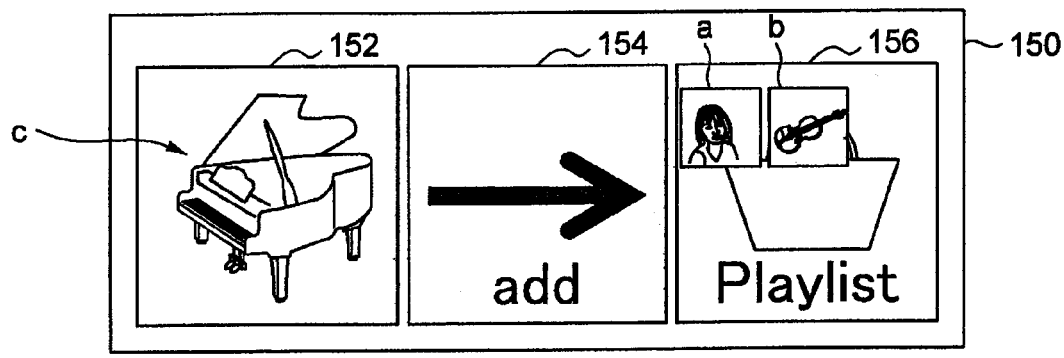

FIGS. 5A to 5C are referred to. FIGS. 5A to 5C are diagrams for explaining variations of the operation method according to the embodiment.

FIG. 5A shows a case in that music contents a is registered in an empty playlist. In the contents display area 152, the music contents a are displayed. In the device display area 156, an empty playlist is displayed. In the operation display area 154, an object "add" representing "registration/addition" is displayed. In this state, when the execution button 158 is depressed, the music contents a are registered in the empty playlist. However, even though the execution button 158 is depressed, the music contents a are not actually copied, and the playlist in which the music contents a are registered is merely generated by the playlist generating unit 116.

FIGS. 5B and 5C show cases in that music contents b and c are added to existing playlists. In the contents display area 152, the music contents b or c are displayed. In the device display area 156, a playlist in which other music contents are registered in advance is displayed. In the operation display area 154, an object "add" representing "registration/addition" is displayed. In this state, when the execution button 158 is depressed, the music contents b or c are added to the playlist. However, at this time, substances of the music contents a, b, and c are not copied. When the playlist is generated, the playlist generating unit 116 stores the playlist in the storage unit 110.

In the contents display area 152, a plurality of contents held by the different information providing units 10 may be displayed as candidates. However, the device control terminal 100 according to the embodiment may register even the contents held by the different information providing units 10 in the same playlist. The user can register video contents and music contents in the same playlist. As a matter of course, even contents of different types can be registered in the playlist regardless of the types.

Example 3 of Operation Method

Execution of Playlist

Figure 6A:
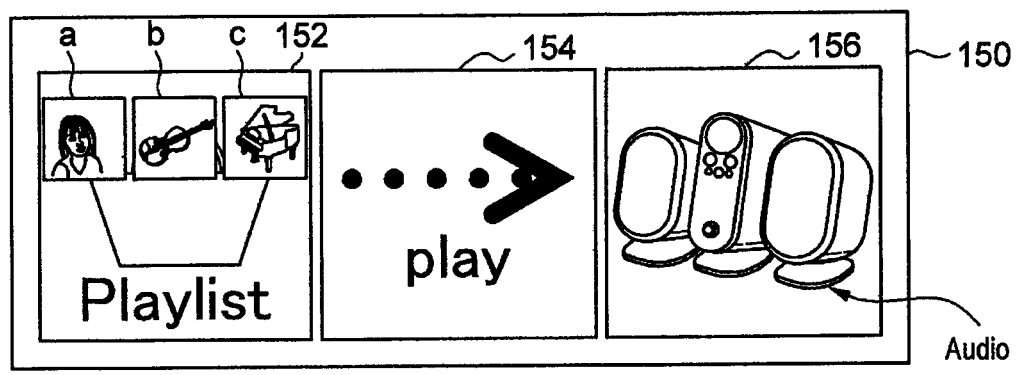
FIGS. 6A and 6B are diagrams for explaining a playlist reproducing method according to the embodiment.
Figure 6B:
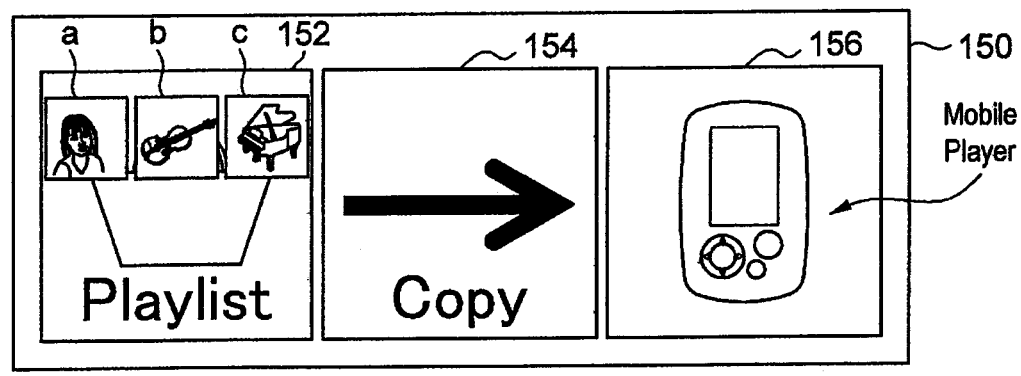

FIGS. 6A and 6B are referred to. FIGS. 6A and 6B are diagrams for explaining variations of the operation method according to the embodiment.

FIG. 6A shows a case in that a playlist in which the music contents a, b, and c are registered is output by an audio device (Audio). In the contents display area 152, the playlist in which the music contents a, b, and c are registered is displayed. In the device display area 156, the audio device is displayed. In the operation display area 154, an object "play" representing "reproduction" is displayed. In this state, when the execution button 158 is depressed, the music contents a, b, and c registered in the playlist are reproduced by the audio device.

FIG. 6B shows a case in which a playlist in which the music contents a, b, and c are registered is recorded on a mobile audio player (Mobile Player). In the contents display area 152, the playlist in which the music contents a, b, and c are registered is displayed. In the device display area 156, the portable audio player is displayed. In the operation display area 154, an object "Copy" representing "recording" is displayed. In this state, when the execution button 158 is depressed, the music contents a, b, and c registered in the playlist are recorded on the mobile audio player.

Example 4 of Operation Method

Detection of Position Information

Figure 7:
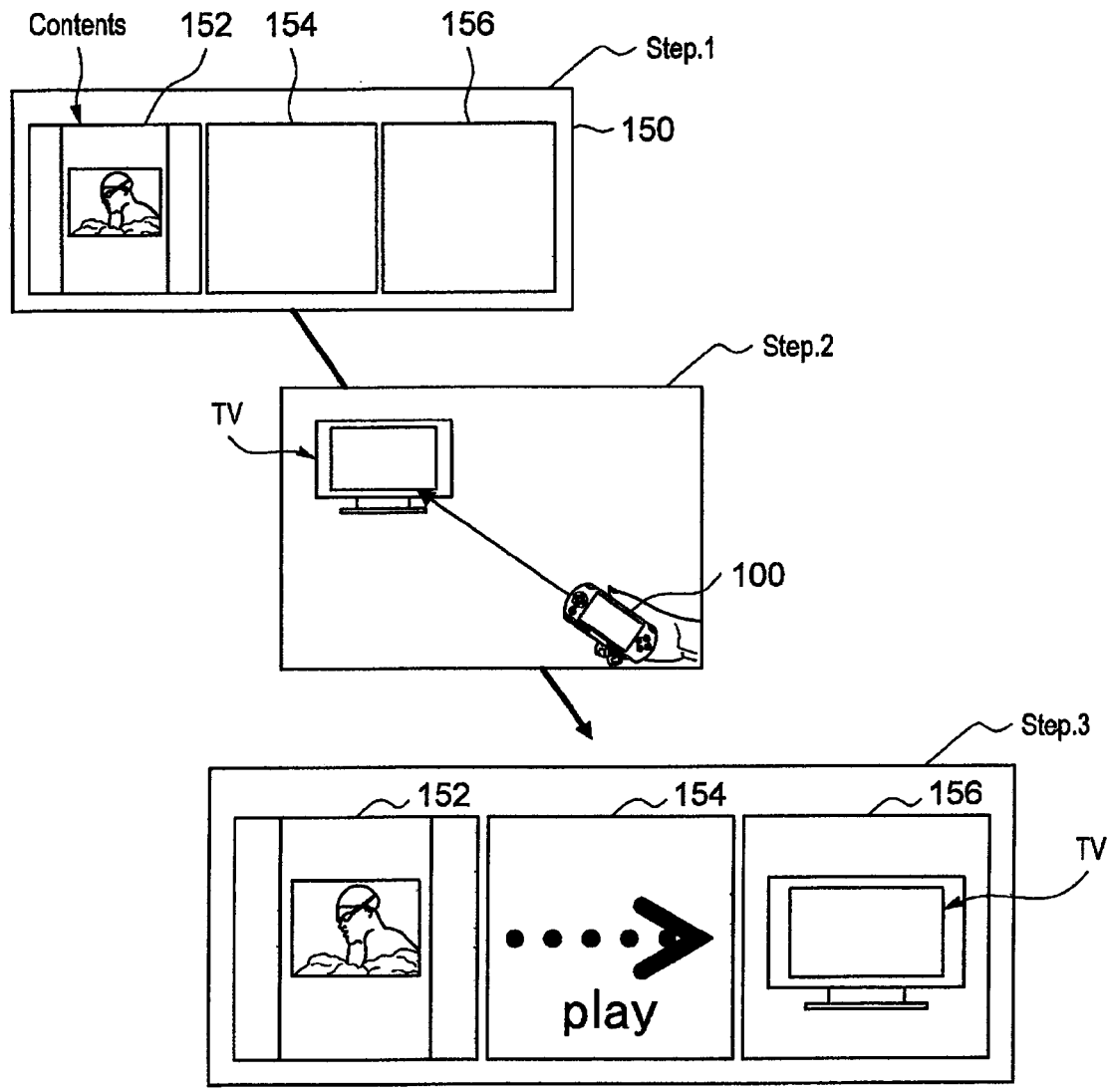
FIG. 7 is a diagram for explaining a modification of a device selecting method according to the embodiment.

Next, FIG. 7 is referred to. FIG. 7 is a diagram for explaining an example of a device selecting method according to the embodiment.

As shown in FIG. 7, a user selects contents (Contents) displayed in the contents display area 152 (Step. 1). The user executes an operation to acquire physical position information such as a positional relationship or a distance to a desired device (TV) (Step. 2). For example, the user points the device recognizing unit 108 held by the device control terminal 100 at the desired device (TV) and operates the operation unit 102 to make it possible to acquire device information of the device (TV). As a result, since a transmission source object and a transmission destination object are selected, the user selects a desired operation from candidates of processing method objects narrowed down by the device/contents selecting unit 112 and executes the operation (Step. 3). In the example in FIG. 7, since the video contents and the television are selected, the user selects a reproducing operation to make it possible to reproduce the video contents on the television.

When the contents selected by the contents display area 152 are stored in the plurality of information providing units 10, the device control unit 118 can also perform control to acquire contents from the information providing unit 10 closest to the device on the basis of the position information of the desired device (TV) acquired by the device recognizing unit 108. Furthermore, the device/contents selecting unit 112 can also display only the contents held by the information providing unit 10 relatively close to the device on the contents display area 152 on the basis of the position information of the desired device acquired by the device recognizing unit 108. In the example in FIG. 7, the objects are sequentially selected from the transmission source object. However, a user can select the transmission destination object or the processing method object first and then select contents from candidates of a transmission source object narrowed down by the position information of the device. Acquisition of the position information by the device recognizing unit 108 is realized by using a technique of recognition of a field intensity or an in-house position.

(Use of History Information)

Figure 8:
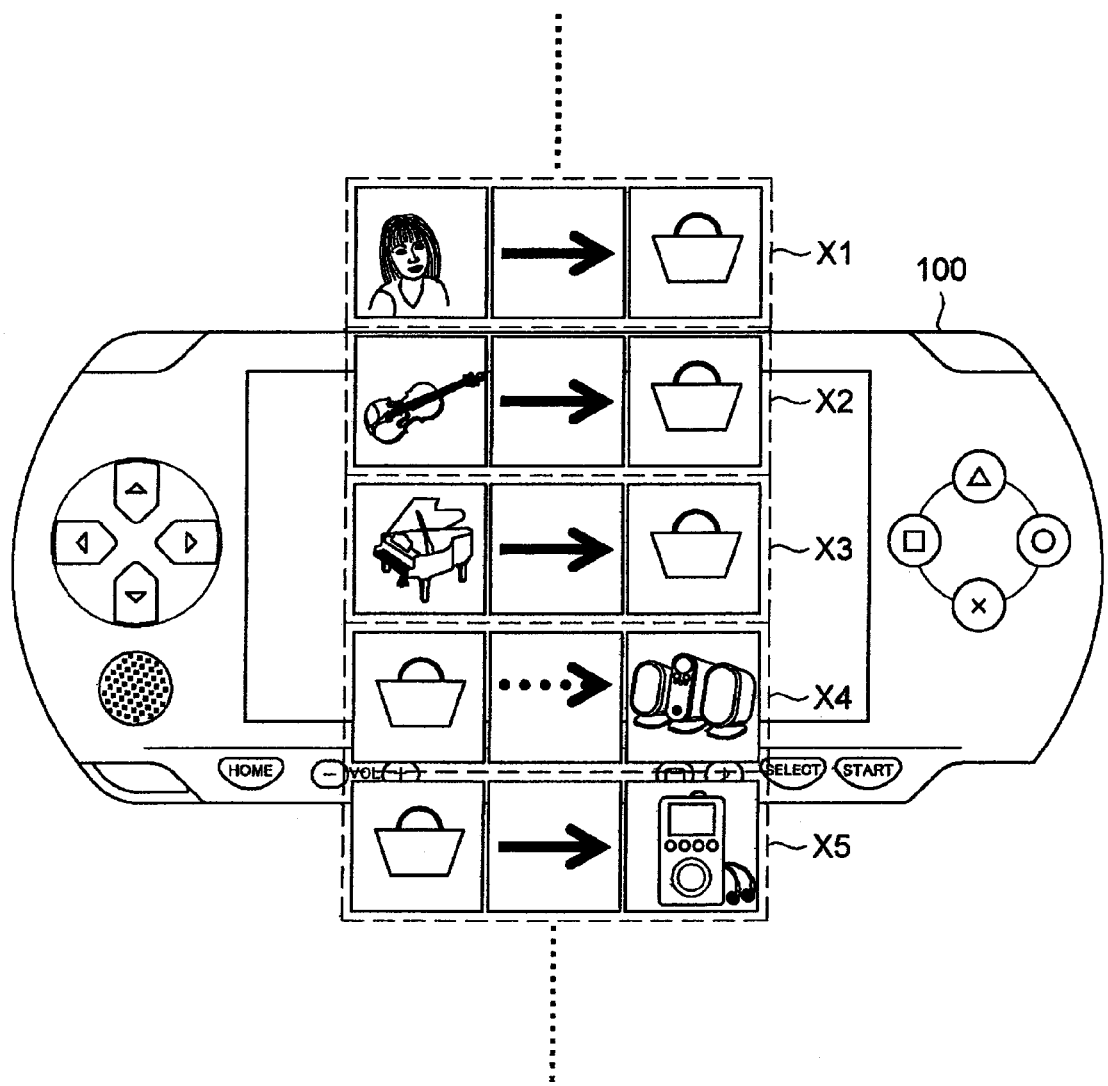
FIG. 8 is a diagram for explaining a method of selecting history information according to the embodiment.

A method of using history information according to the embodiment will be described below with reference to FIG. 8. FIG. 8 is a diagram for explaining the method of using history information according to the embodiment.

As described above, the device control terminal 100 according to the embodiment can store the combination information y1 generated by the device/contents selecting unit 112 in the storage unit 110. Therefore, the display control unit 114, as shown in FIG. 8, can display the combination information y1 executed by a user in the past on the display unit 150 as history information. The history information is expressed as, for example, a combination between selected contents, a selected device, and a selected operation. As shown in FIG. 8, the history information includes a process (X1, X2, or X3) of registering music contents in a playlist, a process (X4) of reproducing the playlist, a process (X5) of copying music contents registered in the playlist to the mobile audio player, and the like.

In this manner, when the history information is held in advance, the user is not required to re-execute the same operation as an operation performed in the past. For this reason, a desired operation can be more easily realized. As shown in FIG. 8, the device control terminal 100 can scroll-display the history information.

The details of the operation method or the like are explained focusing around the display configuration of the inter-device operation interface according to the embodiment. As described above, when the inter-device operation interface according to the embodiment is applied, contents, playlists, devices, services, operation methods, and the like can be operated on the basis of an integrated operation system. The interface is very easily understood by a user, and is improved in operability. Since the user can operate the interface without regard to information representing physical positions of the services or contents, even though a device configuration on a network is complex, or even though the network configuration dynamically changes, it is advantageous that a method of operating contents by a user does not change.

[Hardware Configuration]

The functions of the constituent elements held by the terminal can be realized by an information processing apparatus having, for example, a hardware configuration shown in FIG. 9. FIG. 9 is a diagram for explaining a hardware configuration of an information processing apparatus which can realize the functions held by the constituent elements of the apparatus.

As shown in FIG. 9, the information processing apparatus mainly includes a CPU (Central Processing Unit) 902, a ROM (Read Only Memory) 904, a RAM (Random Access Memory) 906, a Host bus 908, a bridge 910, an external bus 912, an interface 914, an input unit 916, an output unit 918, a storage unit 920, a drive 922, a connection port 924, and a communication unit 926.

The CPU 902 functions as an arithmetic processing unit or a control unit and controls an entire operation of the constituent elements or some of the constituent elements on the basis of various programs recorded on the ROM 904, the RAM 906, the storage unit 920, or the removal recording medium 928. The ROM 904 stores, for example, a program loaded on the CPU 902 or data or the like used in an arithmetic operation. The RAM 906 temporarily or perpetually stores, for example, a program loaded on the CPU 902 or various parameters or the like arbitrarily changed in execution of the program. These constituent elements are connected to each other by, for example, the host bus 908 which can perform high-speed data transmission. The host bus 908, for example, is connected to the external bus 912 in which a data transmission speed is relatively low through the bridge 910.

The input unit 916 is, for example, an operation unit such as a mouse, a keyboard, a touch panel, button, a switch, or a lever. The input unit 916 may be a remote control unit (so-called remote) that can transmit a control signal by using an infrared ray or other radio waves. The input unit 916 includes an input control circuit or the like to transmit information input by using the operation unit to the CPU 902 through an input signal.

The output unit 918 is, for example, a display device such as a CRT (Cathode Ray Tube), an LCD (Liquid Crystal Display), a PDP (Plasma Display Panel), or an ELD (Electro-Luminescence Display), an audio output device such as a loudspeaker or headphones, a printer, a mobile phone, or a facsimile that can visually or auditorily notify a user of acquired information.

The storage unit 920 is a device to store various data, and includes, for example, a magnetic storage device such as a hard disk drive (HDD; Hard Disk Drive), a semiconductor storage device, an optical storage device, or a magnetooptical storage device, or the like.

The drive 922 is a device that reads information recorded on the removal recording medium 928 such as a magnetic disk, an optical disk, a magnetooptical disk, or a semiconductor memory or writes information in the removal recording medium 928. The removal recording medium 928 is, for example, a DVD medium, a Blue-ray medium, an HD-DVD medium, a compact flash (CF; compactFlash) (registered trademark), a memorystick, or an SD memory card (Secure Digital memory card), or the like. As a matter of course, the removal recording medium 928 may be, for example, an IC card (Integrated Circuit Card) on which a non-contact IC chip is mounted, an electronic device, or the like.

The connection port 924 is a port such as an USB (Universal Serial Bus) port, an IEEE1394 port, an SCSI (Small Computer System Interface), an RS-232C port, or an optical audio terminal to which the external connection device 930 is connected. The external connection device 930 is, for example, a printer, a mobile music player, a digital camera, a digital video camera, an IC recorder, or the like.

The communication unit 926 is a communication device to be connected to a network 932. For example, a communication card for a wired or wireless LAN (Local Area Network), Bluetooth (registered trademark), or WUSB (Wireless USB), an optical communication router, an ADSL (Asymmetric Digital Subscriber Line) router, various communication modems, or the like is used. The network 932 connected to the communication unit 926 includes a wiredly or wirelessly connected network. For example, the Internet, a home-use LAN, infrared communication, broadcasting, satellite communication, or the like is used.

It should be understood by those skilled in the art that various modifications, combinations, sub-combinations and alterations may occur depending on design and other factors insofar as they are within the scope of the appended claims or the equivalents thereof.

In the above explanation, music contents and video contents are given as main examples. However, the inter-device operation interface according to the present invention is not limited to these contents. For example, a text file, a game program, or the like may be used. Furthermore, when a speech communication device such as a telephone is selected as a transmission source object and a transmission destination object, and when calling is selected as a processing method object, a user can call the speech communication device serving as the transmission destination object. In this manner, an application range of the inter-device operation interface according to the embodiment is not limited to the types of the network and the communication line, and is not limited to types of devices or the types of contents to be handled.

In the example in FIG. 2, the combination information y1, the contents information y2, the device information y3, and the playlist y4 are independently written in the storage unit 110. However, the pieces of information can also be held in a database as pieces of information which work together with each other.

What is claimed is:

1. An inter-device operation interface that is displayed on a display unit of a device control terminal that controls an operation between devices connected through a network, comprising:
    a contents display area to display information directly representing respective media contents held by a device, and configured to display information of the device that provides the media contents;
    an operation display area to display information of an operation executed to the media contents; and
    a device display area to display information serving as a target of the operation,
    wherein when information displayed in each of the display areas is selected by using an operation unit of the device control terminal, a service provided by the device connected through a wide-area network is displayed in the device display area as a candidate of the target,
    wherein the information of media contents held by the device, the information of the operation executed to the media contents, and the information serving as the target of the operation are each expressed by an icon comprising a thumbnail image, and
    wherein the contents display area, the operation display area, and the device display area are all concurrently displayed on the display unit.

2. The inter-device operation interface according to claim 1, wherein
    in the device display area, as the service, information of a network storage service that records information on the device connected through the wide-area network and publishes the information to make it possible to browse the information from another device connected to the wide-area network is displayed.

3. The inter-device operation interface according to claim 2, wherein
    in the device display area, as information of the network storage service, address information representing a location of the device that provides the network storage service is displayed.

4. The inter-device operation interface according to claim 1, wherein
    in the device display area, as the candidate of the target, one device or a plurality of devices that can reproduce or record the media contents are displayed.

5. The inter-device operation interface according to claim 1, wherein
    in the device display area, as a candidate of the target, a playlist to which information of media contents can be added is displayed.

6. The inter-device operation interface according to claim 1, wherein
    in the device display area, information of the device selected on the basis of a positional relationship or a distance between the device and the device control terminal is displayed.

7. The inter-device operation interface according to claim 1, wherein
    in the contents display area, as information of the device, folder information representing a position in the device in which the media contents are stored is displayed.

8. The inter-device operation interface according to claim 1, wherein in the contents display area, as information of the device, physical position information representing a position where the device is installed is displayed.

9. The inter-device operation interface according to claim 1, wherein
in the contents display area, a playlist representing a combination between a plurality of contents is displayed.

10. The inter-device operation interface according to claim 1, wherein
when information displayed in each area is selected by using the operation unit of the device control terminal, depending on a type of information selected from pieces of information displayed in the contents display area, the operation display area, and the device display area, information displayed in another display area is restricted by information matched with the type of the selected information, or information matched with the type of the selected information is emphatically displayed.

11. The inter-device operation interface according to claim 1, wherein
in the operation display area, reproducing, recording, moving, copying, or uploading of media contents is displayed as an operation depending on the information displayed in the contents display area or the type of the information selected from the pieces of information displayed in the device display area.

12. The inter-device operation interface according to claim 1, wherein
the icon representing the information of the operation executed to the media contents is displayed between the icon representing the information of media contents held by the device and the icon representing the information serving as the target of the operation, and the icon representing the information of the operation executed to the media contents visually expresses an operation type and an operation direction depicting a directional flow of the media contents.

13. A device control terminal which has a display unit on that an inter-device operation interface is displayed and controls an operation between devices connected through a network, comprising:
a display control unit that controls display of a contents display area to display information directly representing respective media contents held by a device, and configured to display information of the device that provides the media contents, an operation display area to display information of an operation executed to the media contents as the inter-device operation interface, and a device display area to display information serving as a target of the operation; and
an operation unit that selects information displayed in the display areas to execute the selected operation,
wherein when information displayed in each of the display areas is selected by using the operation unit of the device control terminal, a service provided by the device connected through a wide-area network is displayed in the device display area as the candidate of the target,
wherein the information of media contents held by the device, the information of the operation executed to the media contents, and the information serving as the target of the operation are each expressed by an icon comprising a thumbnail image, and
wherein the contents display area, the operation display area, and the device display area are all concurrently displayed on the display unit.

14. The device control terminal according to claim 13, wherein
in the device display area, as a service, information of a network storage service that records information on the device connected through the wide-area network and publishes the information to make it possible to browse the information from another device connected to the wide-area network is displayed.

15. The device control terminal according to claim 14, wherein
in the device display area, as information of the network storage service, address information representing a location of the device that provides the network storage service is displayed.

16. A non-transitory computer-readable medium configured to execute a program which has a display function to display an inter-device operation interface and causes a computer to realize a function that controls an operation between devices connected through a network, comprising:
a display control function that controls display of a contents display area to display information directly representing respective media contents held by a device, and configured to display information of the device that provides the media contents, an operation display area to display information of an operation executed to the media contents as the inter-device operation interface, and a device display area to display information serving as a target of the operation; and
an execution function that, when information displayed in each of the display areas is selected, executes the selected operation,
wherein when information displayed in each of the display areas is selected by the execution function, the computer is caused to realize a function that displays a service provided by the device connected through a wide-area network in the device display area as the candidate of the target,
wherein the information of media contents held by the device, the information of the operation executed to the media contents, and the information serving as the target of the operation are each expressed by an icon comprising a thumbnail image, and
wherein the contents display area, the operation display area, and the device display area are all concurrently displayed on the display unit.

17. The non-transitory computer-readable medium according to claim 16, wherein
in the device display area, as a service, information of a network storage service that records information on the device connected through the wide-area network and publishes the information to make it possible to browse the information from another device connected to the wide-area network is displayed.

18. The non-transitory computer-readable medium according to claim 17, wherein
in the device display area, as information of the network storage service, address information representing a location of the device that provides the network storage service is displayed.

* * * * *